Sept. 27, 1960 W. F. STEAGALL 2,954,480
SIGNAL RESPONSIVE NETWORK
Filed Dec. 16, 1954 3 Sheets-Sheet 1

INVENTOR.
WILLIAM F. STEAGALL
Gerry Light
ATTORNEY

Sept. 27, 1960 W. F. STEAGALL 2,954,480

SIGNAL RESPONSIVE NETWORK

Filed Dec. 16, 1954

3 Sheets-Sheet 2

*INVENTOR.*
WILLIAM F. STEAGALL

ATTORNEY

INVENTOR.
WILLIAM F. STEAGALL
ATTORNEY

United States Patent Office 2,954,480

Patented Sept. 27, 1960

2,954,480

SIGNAL RESPONSIVE NETWORK

William F. Steagall, Merchantville, N.J., assignor to Sperry Rand Corporation, a corporation of Delaware Filed Dec. 16, 1954, Ser. No. 475,773

7 Claims. (Cl. 307—88)

This invention relates to a signal controlled solid-state translating device. More particularly this invention relates to a binary half-adder which utilizes magnetic phenomena to achieve a desired logical function.

In the past the accuracy and operation of equipment that performed such functions as computing, sorting and the like depended in part on the reliability of electron valves. Electron valves have been used for amplification and translation purposes in circuits that perform logical functions. In particular, circuit combinations employing electron valves have been designed to perform such logical functions as comparison and partial binary addition. By partial binary addition is meant the adding of two binary digits to produce a sum or carry output. Further, the carry output once developed will not be reintroduced into the input of the binary adder. Circuits which perform partial binary additions are herein called binary half-adders.

The electron valves used in binary half-adders are inherently subject to a limited life of operation. Moreover, their reliability decreases as a function of their time in operation. In addition, electron valves are subject to breakage and as a result circuits employing them are fragile. Further, a disadvantage of employing electron valves in circuits which perform logical functions is that the information stored in the circuit will be destroyed in case of a power interruption.

It is herein proposed that solid-state translating devices be utilized in circuit combinations to perform the functions of a half-adder. These devices have both a longer operating life and greater reliability than do electron valves. Furthermore, solid-state signal translating devices are rugged and are not subject to breakage. In addition, information stored in circuits using these devices will remain available even after a power interruption.

It is further proposed that one or a plurality of the said translating devices be used in a circuit that performs the functions of a half-adder.

The operation of a circuit employing a solid-state signal translating element depends upon the magnetic characteristics of the element. Solid-state translating devices employing magentic phenomena display a high impedance when operating over the portion of the hysteresis loop from minus residual flux density to plus residual flux density, and show a low impedance when traveling from plus or minus residual flux density toward plus or minus saturation flux density, respectively. Use can be made of these effects for signal translating and amplifying purposes.

Accordingly it is a principal object of this invention to provide a new and improved signal translating device employing magnetic phenomena.

Another object of this invention is to provide a new and improved binary half-adder employing solid-state translating devices that responds uniquely with respect to the number of input lines which are energized at one time.

It is a further object of this invention to provide a new and improved signal responsive network employing a solid-state translating device that responds uniquely to a coincidence of pulses on the input lines of the network, energizing a particular output line.

Another object of this invention is to provide an improved signal responsive network employing solid-state translating devices that produces a unique output when any of its input lines are excited.

Another object of this invention is to provide a new and improved binary half-adder of rugged construction.

Still another object of this invention is to provide a new and improved binary half-adder which will retain information even after a power interruption.

The foregoing and other objects of this invention will become more apparent as the following detailed description of this invention is read in conjunction with the drawings, in which.

Figure 1:
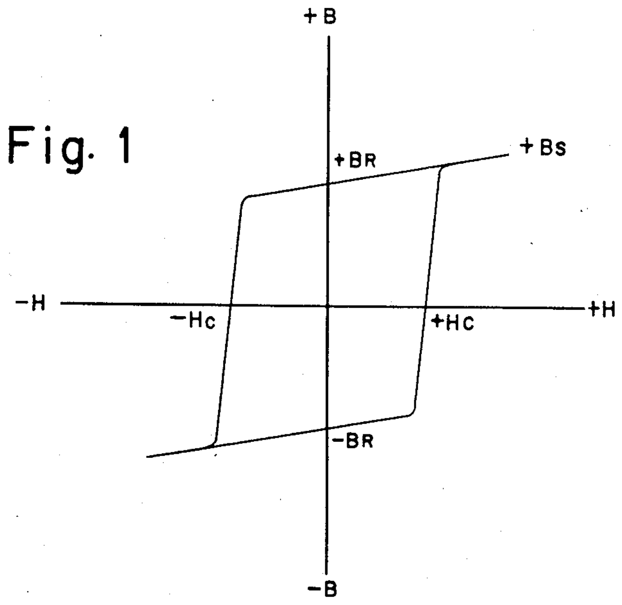
Figure 1 illustrates an idealized hysteresis loop of a material which may be used as the core member of the solid-state signal translating device to be described.

Refer now to Figure 1, which illustrates an idealized hysteresis loop of a material which may be used as the core members of the solid-state signal translating devices used in the invention. The term B represents flux density and the term H represents magnetic intensity. $B_r$ signifies residual flux density and $B_s$ designates saturation flux density. $H_c$ represents the reversed magnetic intensity needed to reduce the flux density to zero after the core has been magnetized to saturation in the opposite direction, and it is called the coercive force.

The core material may be made of a variety of materials among which are various types of ferrites and the various kinds of ferromagnetic alloys, including Orthonik and 4–79 Moly-Permaloy. These materials may have been different heat treatments to give them different properties. In addition to the wide variety of materials applicable, the cores of the signal translating devices may be constructed in a number of different geometries involving both closed and open paths. For example, cup-shaped, strips of material or toroidal cores are possible. It is to be understood that the invention is not limited to any specific geometries of the cores nor to any specific materials therefor, and that the examples given are illustrative only. The only requisite is that the material possesses a hysteresis loop preferably approaching the idealized loop as shown in Figure 1.

It shall be understood that all references herein to the state of the core material are made in conjunction with Figure 1 of this application.

Figure 2:
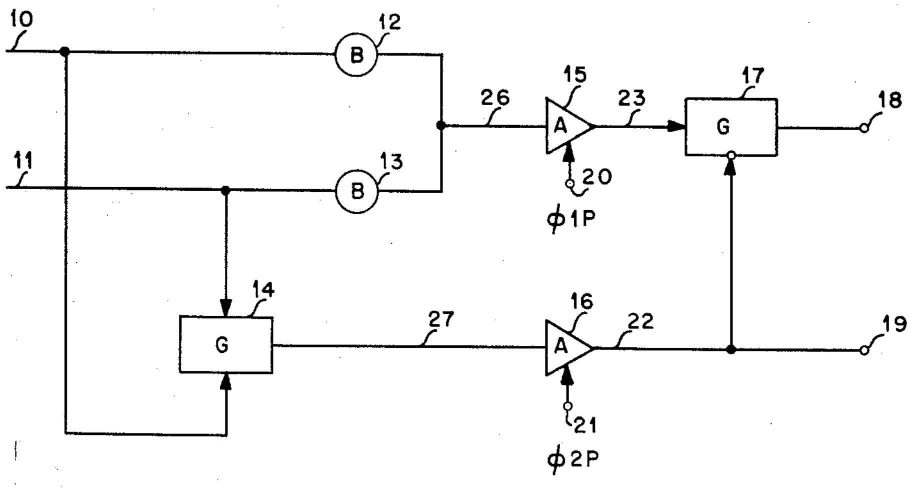
Figure 2 illustrates in block form a signal responsive network embodying the invention.

Referring now to Figure 2 there are shown two magnetic amplifiers 15 and 16 which may be any one of the type described in the following two applications: Theodore H. Bonn and Robert D. Torrey, Serial No. 408,858, filed January 8, 1954, entitled "Signal Translating Device"; and John Presper Eckert, Jr., and Theodore H. Bonn, Serial No. 382,180, filed September 24, 1953, entitled "Signal Translating Device." These applications are assigned to the assignee of this application.

The input 26 of amplifier 15 is connected to the outputs of buffers 12 and 13. The output 23 of amplifier 15 is connected to the input of inhibitory gate 17 so as to pass output signals from amplifier 15 through gate 17. Power pulses Φ1 are applied to amplifier 15 at terminal 20 to supply the power for the operation of this amplifier.

The input 27 of amplifier 16 is connected to the output of coincidence gate 14. The output of amplifier 16 is connected to gate 17 so as to inhibit output signals from amplifier 15 from passing through gate 17. Power pulses Φ2 are applied to amplifier 16 at terminal 21 to supply the power for its operation.

Two input lines 10 and 11 are connected to the inputs of buffers 12 and 13, respectively, in addition, the input lines 10 and 11 are connected to the two inputs of permissive gate 14. Outputs may be taken from the signal responsive network at either 18 or 19 depending on the condition of the input signals.

The operation of this network is best understood with reference to various combinations of potentials which may be applied to the inputs. Graphic illustrations of the signals applied to power pulse terminals 20 and 21 as well as a possible combination of input signals which may be present on input lines 10 and 11 are shown in Figures 4A, 4B, 4C and 4D. The power pulses of phase 1 (Φ1) (Fig. 4C) are applied to amplifier 15 at terminal 20 and are preferably but not necessarily bipolar symmetrical pulses that have a voltage swing between +E and −E volts. The power pulses of phase 2 (Φ2) (Fig. 4D), which are applied to amplifier 16, at terminal 21, are equal in magnitude and 180° out of phase with the power pulses Φ1 that are applied to amplifier 15.

During time period, $T_1$ to $T_2$, there is a rectangular signal pulse of E volts present on input line 10 while there is no pulse present on input line 11. Under these conditions buffer 12 transmits a pulse to amplifier 15 which will produce an output during the second pulse time period, $T_2$ to $T_3$, as it is a characteristic of a magnetic amplifier of the type described to produce an output which is delayed one pulse time period after the amplifier has received an input. The signal pulse on input line 10 will not pass through coincidence gate 14 to amplifier 16 because of the absence of a pulse on the second input to gate 14 from input line 11, therefore, amplifier 16 will not produce an output at 22 and gate 17 will not be inhibited from passing signals therethrough. Gate 17 thus passes the pulse generated by magnetic amplifier 15, producing an output (Fig. 4E) at 18 during the period from $T_2$ to $T_3$.

During third time period, $T_3$ to $T_4$, there is a signal pulse present on input line 11, while there is no pulse present on input line 10. Under these conditions buffer 13 transmits a pulse to amplifier 15. Amplifier 15 produces an output, which occurs one pulse time period after it has received an input pulse via line 26. The output 23 of amplifier 15 is connected to the input of inhibitory gate 17, so as to pass output signals from amplifier 15 through gate 17.

The signal pulse on input line 11 will not pass through permissive gate 14 to amplifier 16, because of the absence of a pulse on the first input to gate 14 from input line 10, and thus amplifier 16 will not produce an output at 22. Therefore, gate 17 will not receive an inhibitory signal and will pass the pulse generated by amplifier 15, producing an output at 18 (Fig. 4E) during the period $T_4$ to $T_5$.

In the 5th pulse time period, $T_5$ to $T_6$ there are coincident signal pulses present on both input lines 10 and 11, shown in Figs. 4A and 4B, respectively. Under these conditions both buffers 12 and 13 pass coincident pulses to the input 26 of amplifier 15. Amplifier 15 produces an output which occurs one pulse time after it has received an input.

The coincident signal pulses present on input lines 10 and 11 pass through coincidence gate 14 to amplifier 16, because of the presence of pulses on both inputs to coincidence gate 14. Amplifier 16 produces an output which is delayed one pulse time after it has received an input. Since gate 17 receives a permissive signal from amplifier 15 and an inhibitory signal from amplifier 16, the output from amplifier 15 on line 23 will not be passed by gate 17 and no output will be present at 18. However, an output from amplifier 16 will be present at 19.

When signal pulses are not present on either input lines 10 or 11, it is obvious, from the foregoing explanation, that an output will not be generated at either 18 or 19.

Figure 3:
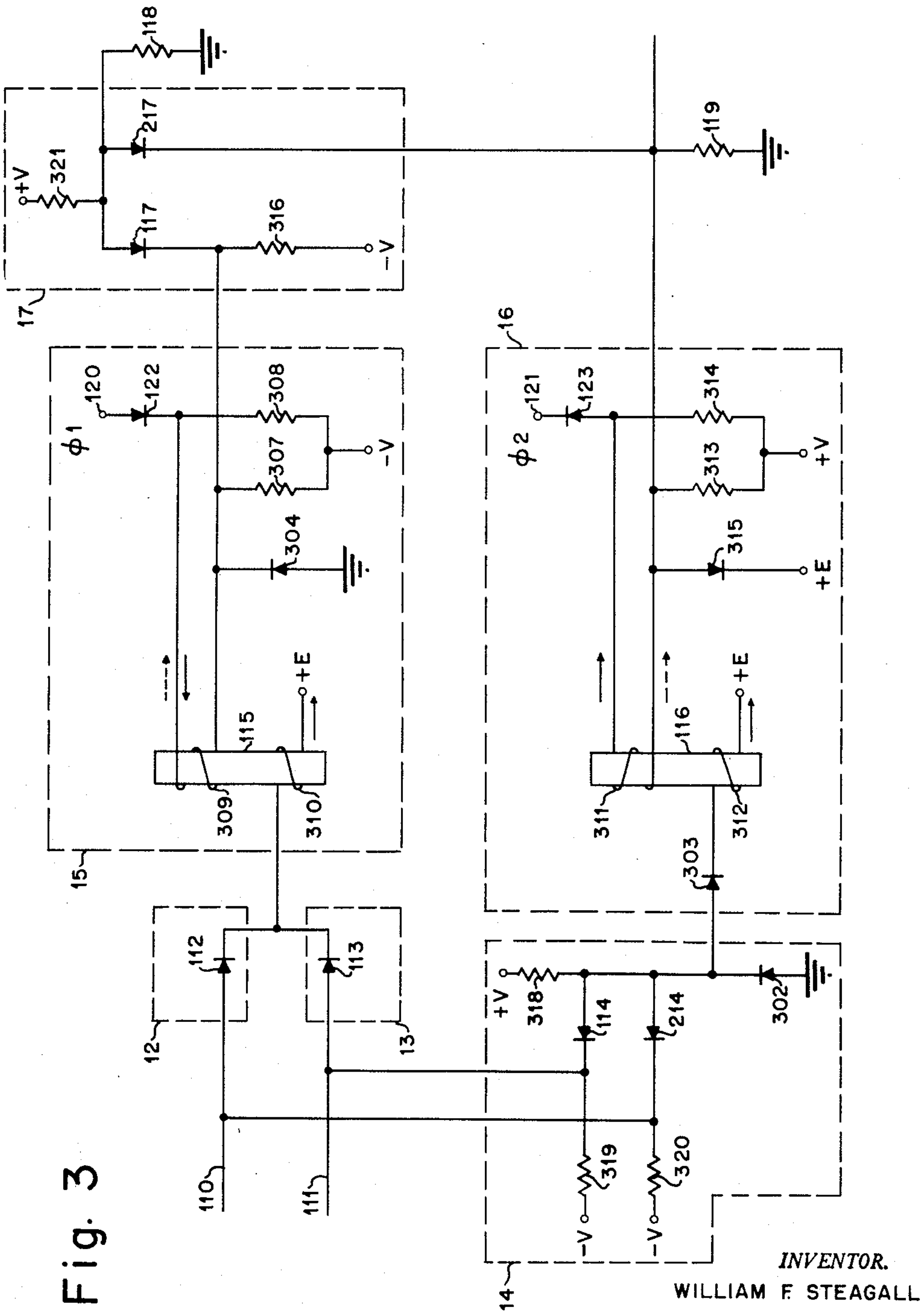
Fig. 3 illustrates in schematic form a signal responsive network conforming to the block diagram shown in Figure 2.

Refer now to Figure 3 which illustrates schematically a signal responsive network conforming to the block diagram of Figure 2. There are shown two magnetic amplifiers corresponding to amplifiers 15 and 16 of Figure 2. The amplifier 15 comprises a core 115, made of a ferromagnetic material, which preferably but not necessarily exhibits a hysteresis loop approaching the idealized hysteresis loop shown in Figure 1, with a signal input winding 310 and a power pulse winding 309 wound thereon. One end of the signal winding 310 is connected to a constant source of +E volts. The other end of the signal winding 310 is connected to the output of input buffers 112 and 113, which correspond to buffers 12 and 13 of Figure 2. The power pulse winding 309 is connected to the following circuit elements: one end of winding 309 is connected in common to the cathode of diode 122, and resistor 308. The other end of winding 309 is connected in common to the cathode of diode 304, resistor 307, load resistor 316, and the cathode of diode 117. The anode of diode 304 is connected to ground potential and the terminals of resistors 307, 308 and 316 not connected to the power winding 309 are connected to a constant source of −V volts. The anode of diode 122 is connected to the source 120 which supplies the power pulses of phase (Φ1). These power pulses from source 120 may be bipolar rectangular pulses which vary from +E to −E volts.

The magnetic amplifier 16 comprises, a core 116, made of ferromagnetic material which preferably exhibits a hysteresis loop approaching the idealized hysteresis loop shown in Figure 1, with a signal winding 312 and a power pulse winding 311 wound thereon. One terminal of the signal winding 312 is connected to a constant source of +E volts. The other end of the signal winding 312 is connected through diode 303 to the output of a gating network which will be described in detail later. The power pulse winding 311 is connected to the following circuit elements; one end of winding 311 is connected in common to the anode of diode 123 and one terminal of resistor 314; the other end of winding 311 is connected in common to the anode of diode 315, to the cathode of diode 217, and to one terminal of resistor 313 and load resistor 119. The other terminals of resistors 314 and 313 are connected to a constant source of +V volts, and the other terminal of load resistor 119 is connected to ground potential. The cathode of diode 315 is connected to a constant source of +E volts. The cathode of diode 123 is connected to the source 121 which supplies the power pulses Φ2. Power pulses Φ2 from source 121 are equal in magnitude to, and 180° out of phase with, the Φ1, power pulses from source 120.

The outputs of amplifiers 15 and 16 are each connected to inputs of a gate, corresponding to gate 17 of Figure 2. The output of amplifier 15 is connected to the cathode of diode 117 and the output of amplifier 16 is connected to the cathode of diode 217. The remaining element of gate 17 is resistor 321 which is connected between the anode of diode 217 and a constant source of +V volts. Load resistor 118 is connected between ground potential and the common connection of the anode of diode 217, and the anode of diode 117.

The input line 110 of this circuit is connected to the anode of diode 112 and input line 111 is connected to the anode of diode 113. In addition, these input lines are connected to a gating element which corresponds to coincidence gate 14 of Figure 2. Input line 111 is connected to the cathode of diode 114 and input line 110 is connected to the cathode of diode 214. The cathode of diode 114 is connected through resistor 319 to a source of —V volts and the cathode of diode 214 is connected through resistor 320 to the same potential. The anodes of diodes 114 and 214 are connected to the cathode of diode 302. The cathode of diode 302 is connected through resistor 318 to a source of +V volts and the anode is connected to ground potential.

The following conventions are adopted relative to the conditions of the cores 115 and 116 in amplifiers 15 and 16.

A positive signal pulse present on input line 110 or 111 causes current to flow through diode 112 or 113 respectively and signal winding 310 of core 115. Current flowing in winding 310, in the direction indicated by the solid arrow on the said winding, tends to drive the core 115 to a state of positive flux saturation. In addition, when positive signal pulses are present on both input lines 110 and 111 the anode potential of diodes 114 annd 214 will rise. When this condition occurs, current flows through winding 312 of core 116 and diode 303. Current flowing in winding 312 (due to the presence of positive signal pulses) in the direction indicated by the solid arrow on the said winding, tends to drive the core 116 to a state of positive flux saturation.

The state of core 115 is also affected by current flowing in the power winding 309. When a positive power pulse from source 120 is applied to the anode of diode 122, current flows through the said diode 122, winding 309 of core 115 and resistor 307 to a source of potential of —V volts. Current flowing in winding 309 due to the positive power pulse from source 120 in the direction indicated by the solid arrow on said winding, tends to drive the core 115 toward a state of positive flux saturation.

In a similar manner the state of core 116 is affected by current flowing in its power winding 311. When a negative going power pulse from source 121 is applied to the cathode of diode 123, current flows through the said diode, winding 311 of core 116, and resistors 313, 314 and 119. Current flowing in winding 311 (due to a negative power pulse from source 121), in the direction indicated by the solid arrow on the said winding, tends to drive the core 116 to a state of positive flux saturation.

In the absence of a positive power pulse from source 120 on the anode of diode 122, current still flows through winding 309 of core 115. This current, herein called the reset current, flows in a circuit from ground through diode 304, winding 309 and resistor 308 to the —V potential source. Current flowing through this circuit in the direction indicated by the broken-line arrow on the said winding, tends to drive the core 115 to a state of negative flux saturation.

Similarly, in the absence of a negative going power pulse from source 121 on the cathode of diode 123, a reset current flows through winding 311 of core 116. This current flows in a circuit from +V potential through resistor 314, winding 311 and diode 315 to +E potential. Current flowing through this circuit in the direction indicated by the broken-line arrow on winding 311, tends to drive the core 116 to a state of negative flux saturation.

Under certain conditions, which shall be set forth in detail later, the flux change due to the reset current will be cancelled. When this occurs it will be assumed that the cores 115 and 116 remain in a state of positive flux remanence due to the effects of a preceding power pulse.

When reset current flows in winding 309, a voltage is induced across winding 310. The polarity of this voltage is such, that the current it tends to produce in winding 310 would oppose the change in core state caused by the current in winding 309. However, the cathodes of both diodes 112 and 113 are biased positively, by the source of potential +E, so that the voltage induced across winding 310, due to the said current in winding 309, cannot cause a current to flow in winding 310.

In like manner, when reset current flows in winding 311, a voltage is induced across winding 312. The polarity of this induced voltage is such, that the current it tends to produce in winding 312 would oppose the change in core state caused by the current in winding 311. However, the cathode of diode 303 is positively biased, by the source of potential +E, and therefore, the voltage induced across winding 312 cannot cause a current to flow in that winding 312.

Summarizing the above, reset current flowing through winding 309 on core 115, establishes a flux change which tends to induce a voltage in the signal input coil 310. In order to protect the input circuit connected to diodes 112 and 113 from any interference due to the reset current flow in winding 309, the signal winding 310 is returned to a positive voltage of +E volts. This positive voltage is essentially equal to and opposite in value to the voltage induced or generated in winding 310 by current flowing in the power winding 309 when reset current flows. Therefore, the cathodes of diodes 112 and 113, do not drop below ground potential and current will not flow in the circuit comprising the signal winding 310 and the diodes 112 and 113, due to the flow of reset current in winding 309.

For a similar reason the cathode of diode 312 is connected to a positive potential of +E volts. Thus the reset current through power pulse winding 311 will not cause a current to flow through the signal winding 312.

Figure 4:
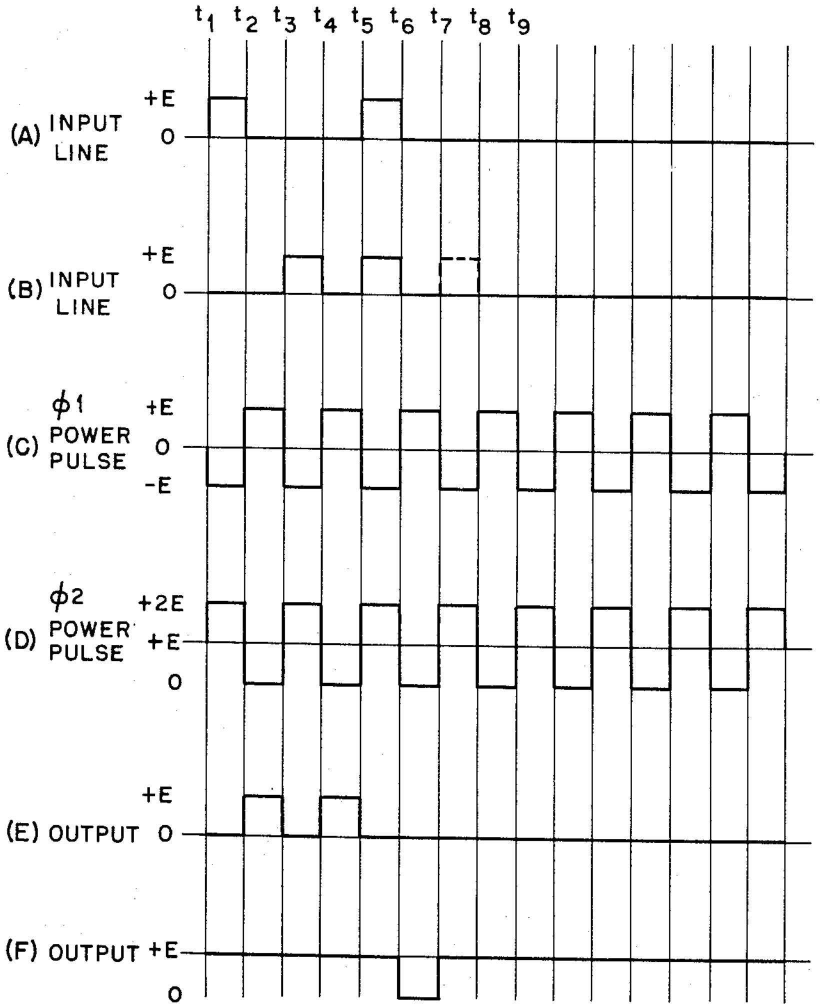
Figure 4 is a timing diagram for the signal responsive network shown in Figure 2 and Figure 3.

The operation of this network may be understood by referring now to Figure 4 in conjunction with Figure 3. Figure 4 illustrates a timing diagram for the signal responsive network shown in Figure 3. Pulse groups Φ1 and Φ2 (Figs. 4C and 4D respectively) appearing at 120 and 121 represent the power or clock pulses that are applied to the core windings of the magnetic amplifiers. It should be noted that the power pulses Φ1 from source 120 (which are applied to winding 309) are 180° out of phase with respect to the power pulse Φ2 from source 121 (which are applied to winding 311). Signal input lines 110 and 111 may receive positive-going signals (Figs. 4A and 4B respectively). For optimum operation the positive signals must be so timed and of such duration with respect to the power pulses from sources 120 and 121 that input current flows in the signal windings 310 and 312 until the power pulses cause current to flow in the power pulse windings 309 and 311. Outputs, Figs. 4E and 4F, may be developed across resistors 118 and 119 according to the input at 110 and 111.

For purposes of illustration an operating cycle accommodating four signal pulse positions, $T_1$ to $T_2$, $T_3$ to $T_4$, $T_5$ to $T_6$, and $T_7$ to $T_8$, has been selected. In the first pulse position, $T_1$ to $T_2$, a positive signal pulse of +E volts is present on input line 110 and no signal pulse is present on line 111. The signal pulse on input line 110 causes current to flow through winding 310 of core 115 and diode 112 in the direction indicated by the solid arrow on winding 310. The winding 310 of core 115 is so oriented with respect to core 115, that current flowing through the winding 310 in the direction indicated by the solid arrow, tends to drive the core toward a state of positive flux saturation, and cancels the flux change caused by the reset current flowing from ground potential through diode 304, winding 309, and resistor 308 to —V potential. Thus the core 115 is not driven toward negative flux saturation and remains in a state of positive flux remanence. The positive signal pulse on input line 110 also causes current to flow through resistor 320, raising the cathode potential of diode 214. Since there is no signal present on input line 111 the cathode potential of diode 114 remains substantially at ground potential. Diode 214 and diode 114 in combination with resistors 318, 319 and 320 act as a gating network, so that the cathode potential of diode 302 cannot rise unless a positive signal is simultaneously applied to the cathodes of both diodes 114 and 214. Therefore, the cathode of diode 302 remains at approximately ground potential. Since the anode of diode 303 is connected to cathode of diode 302, it also is at approximately ground potential and consequently current will not flow through winding 312 of core 116. Thus the state of core 116 is not affected by a positive signal appearing only on input line 110.

The next positive power pulse from source 120 appearing at the anode of diode 122 from $T_2$ to $T_3$ causes current to flow through winding 309 of core 115 and resistors 307, 308 and 316. The winding 309 is so oriented with respect to core 115, that current flowing in the direction indicated by the solid arrow on the said winding drives the core toward positive flux saturation. Since core 115 is already in a state of positive flux remanence due to the effects of the current in winding 310 from $T_1$ to $T_2$, the circuit element composed of winding 309 and core 115 offers a low impedance to current passing through winding 309. Thus most of the positive voltage made available by the power pulse Φ1 from source 120 is developed across resistor 307 in parallel with resistor 316. The cathode of diode 117 rises in potential as the voltage is developed across resistor 316. This increase in voltage will be transmitted through diode 117 of gate 17 if the cathode potential of diode 217 is also positive. Assuming this condition is met, an output pulse is developed across resistor 118 from $T_2$ to $T_3$ (Fig. 4C).

Simultaneously with the application of the positive power pulse from source 120 to the anode of diode 122, a negative going power pulse from source 121 is applied to the cathode of diode 123. Current flows through resistor 313, winding 311 of core 116 and diode 123. The winding 311 is so oriented with respect to core 116, that when current flows through winding 31 in the direction indicated by the solid arrow on the said winding, the core 116 is driven toward positive flux saturation. At time $T_3$, for instance, and in the absence of a signal pulse applied through diode 303 to winding 312, and further in the absence of a negative going power pulse applied to the cathode of diode 123, core 116 is in a state of negative flux remanence due to the reset current flowing from +V potential through resistor 314, winding 311 and diode 315 to +E potential. Therefore, when the negative going power pulse from source 121 is applied to winding 311 from $T_3$ to $T_4$, the core 116 traverses its hysteresis loop from negative flux remanence $-B_r$ to positive flux remanence $+B_r$. The circuit element comprising core 116 and winding 311 thus is in a high impedance state. Therefore, the negative-going power pulse from source 121 causes only a small amount of current to flow through winding 311. This small flow of current would normally tend to flow through resistor 119, thereby producing a small undesirable output from amplifier 16. This current flowing through winding 311 is known as, and is herein called, the "sneak" current and is the coercive current necessary to produce the magnetic force $H_c$ to cause the core to traverse its hysteresis loop from $-B_r$ to $+B_r$. Resistor 313 and diode 315 may be employed to eliminate the small undesirable output due to the sneak current. The high positive potential at +V causes a current in resistor 313 and diode 315 which is larger than the "sneak" current. When the sneak current flows it reduces, but does not entirely eliminate, the current passing through diode 315. Thus, the "sneak" current is effectively cancelled. Therefore, the potential across resistor 119 will remain at +E volts in the presence of the "sneak" current alone. It follows that a negative output will not be developed across resistor 119 when the core 116 traverses its hysteresis loop from $-B_r$ to $+B_r$. Further the cathode of diode 217 will remain at positive-potential +E, since it is connected to the anode of diode 315.

There would also be "sneak" currents in connection with amplifier 15 if it were not for diode 304 and resistor 307. These components operate as a sneak current suppressor in substantially the same manner as parts 315 and 313. Therefore, an output will not be developed across resistor 316 when core 115 traverses its hysteresis loop from minus remanence, $-B_r$, to plus remanence, $+B_r$.

In the second pulse position, $T_3$ to $T_4$, there is a positive signal present on input line 111 and no input signal on line 110. The operation of this circuit combination under these circumstances will be substantially the same as just described for a signal present on input line 110 and no signal present on input line 111. However, the circuit operation differs in the following two respects; (1) current now flows through diode 113 and winding 310 instead of diode 112 and winding 310 when the signal is applied and (2) when the signal is applied the cathode potential of diode 114 is raised instead of the cathode potential of diode 214. Notwithstanding these two small changes the rest of the circuit operates in substantially the same manner as previously described. An output is developed across resistor 118 due to a power pulse from source 120 from $T_4$ to $T_5$ (Fig. 4E).

In the third pulse position, $T_5$ to $T_6$, there are coincident signals present on both input lines 110 and 111. The signals on input lines 110 and 111 cause a current to flow through winding 310 of core 115 and diodes 112 and 113 in the direction indicated by the solid arrow on winding 310. The winding 310 is so oriented with respect to core 115, that current flowing through the winding 310 in the direction indicated by the solid arrow, cancels the flux change caused by the reset current flowing from ground potential through diode 304, winding 309, and resistor 308 to −V potential. Thus the core 115 is not driven toward negative flux saturation and remains in a state of positive flux remanence.

The coincident positive signals on input lines 110 and 111 cause current to flow through resistors 320 and 319, respectively, thereby raising the cathode potentials of diodes 214 and 114. Diode 214 and diode 114 act together as part of a gating network so that the cathode potential of diode 302 rises to +E volts when a positive signal is simultaneously applied to the cathodes of both diodes 114 and 214. Consequently the anode of diode 303 is raised to a positive potential and current flows through winding 312. This current flowing through winding 312 cancels the effects of the flux change caused by the reset current flowing from +V potential through resistor 314, winding 311 and diode 315 to +E potential. Thus the core 116 is not driven toward negative flux saturation and remains in a state of positive flux remanence.

The next positive power pulse from source 120 appearing at the anode of diode 122 from $T_6$ to $T_7$ causes a large current to flow through winding 309 of core 115 and resistor 307. In addition current flows through resistor 316 and resistor 308. The winding 309 is so oriented with respect to core 115, that current flowing in the direction indicated by the solid arrow on the said winding drives the core toward positive flux saturation. Since core 115 is already in a state of positive flux remanence due to the effects of the current in winding 310 from $T_5$ to $T_6$, the circuit element comprising winding 309 and core 115 offers a low impedance to current passing through winding 309. Thus most of the voltage made available by the power pulse from source 120 is developed across resistor 307 in parallel with resistor 316. The cathode of diode 117 rises in potential as the voltage is developed across resistor 316. This increase in voltage will be transmitted through diode 117 of gate 17 if the cathode potential of diode 217 remains positive. Assuming that this condition is not met, an output pulse will not be developed across resistor 118.

Simultaneously with the application of the positive power pulse from source 120 to the anode of diode 122, there is applied a negative power pulse from source 121 to the cathode of diode 123. Current then flows through resistor 313, winding 311 of core 116 and diode 123. The winding 311 is so oriented with respect to core 116, that when current flows through winding 311 in the direction indicated by the solid arrow on the said winding, the core 116 is driven toward positive flux saturation. Since core 116 is already in a state of positive flux remanence due to the effects of the signal input current in winding 312 from $T_5$ to $T_6$, the circuit element composed of winding 311 and core 116 offers a low impedance to current passing through winding 311. Thus the negative voltage made available by the power pulse from source 121 is developed across resistors 313 and 119. Since the cathode of diode 217 is connected in common to resistors 119 and 313, the cathode potential of diode 217 will decrease substantially to zero volts when the negative power pulse is developed across the said resistors. The negative going voltage pulse applied to the cathode of diode 217 inhibits gate 17 so that the positive output voltage of amplifier 15 is not transmitted through gate 17. Therefore, an output voltage will not be developed across output resistor 118. However, an output will be developed across output resistor 119 from $T_6$ to $T_7$ (Fig. 4F).

In the fourth pulse position, signal pulses are not applied to either input lines 110 or 111, and it is apparent that an output voltage will not be developed across either output resistor 118 or 119.

Having thus described my new, novel and useful device, I claim to have invented:

1. A computing circuit comprising, a plurality of input lines, a first magnetic amplifier responsive to an input signal and producing a delayed output signal, said magnetic amplifier including a saturable core exhibiting a substantially rectangular hysteresis characteristic, an output winding associated with said core having a power input terminal adapted to receive electric current pulses and a first load means connected in series circuit with said output winding and said terminal, said delayed output being developed across said first load means when said output winding offers a low impedance to the flow of electric current, a buffer connected between the plurality of input lines and the input of the said magnetic amplifier, a first signal translating device with an associated delay element responsive to an input signal and producing a delayed output signal, a coincidence gate connected between the said plurality of input lines and the input of the said signal translating device, an inhibitory gate, the inputs of which are connected to the outputs of said first magnetic amplifier and said first signal translating device, said inhibitory gate preventing the transmission of the output signal of the first magnetic amplifier in response to an output signal from the first signal translating device, a second load means connected to the output of said inhibitory gate and a third load means connected to the output of said first signal translating device whereby signals developed across the second and third load means indicate the previous state of signals on the plurality of input lines.

2. A computing circuit comprising, a plurality of input lines, a first signal translating device with an associated delay element, said first signal translating device responsive to an input and producing a delayed output, a buffer connected between the plurality of input lines and the input of the said first signal translating device, a first magnetic amplifier responsive to an input and producing a delayed output, said magnetic amplifier including a saturable core exhibiting a substantially rectangular hysteresis characteristic, an output winding associated with said core having a power input terminal adapted to receive electric current pulses and a load means connected in series circuit with said output winding and said terminal, said delayed output being developed across said load means when said output winding offers a low impedance to the flow of electric current, a coincidence gate connected between the said plurality of input lines and the input of the said magnetic amplifier, an inhibitory gate, the inputs of which are connected to the outputs of the first magnetic amplifier and the first signal translating device, said inhibitory gate preventing the transmission of the output of the first signal translating device in response to an output from the said magnetic amplifier, a second load means connected to the output of said inhibitory gate, whereby signals developed across said first and second load means indicate the previous state of signals on the plurality of input lines.

3. A computing device comprising, a first and a second input, means for generating a first series of spaced power pulses, means for generating a second series of spaced power pulses opposite in phase to said first series, means including a first magnetic amplifier for allowing said power pulses of said first series to pass through the said magnetic amplifier if there is a signal present on either of the inputs, means including a second magnetic amplifier for allowing said power pulses of said second series to pass through the second magnetic amplifier if there are signals present on the first and second inputs, simultaneously, means including an inhibitory gate for preventing the passage of the power pulse from the said first magnetic amplifier in response to an output from said second magnetic amplifier, and a first and second load means connected to the output of the inhibitory gate and the output of said second magnetic amplifier, respectively, wherein power pulses developed across the first and second load means indicate the previous state of signals on the first and second inputs.

4. A computing device comprising, means for producing a first series of equally spaced power pulses, means for generating a second series of spaced power pulses opposite in phase to said first series, first and second input terminals for receiving signals to be operated upon, a first magnetic amplifier having a first input to receive the said power pulses of said first series, said first magnetic amplifier having a second input, a buffer connected between the said second input of the first magnetic amplifier and the first and second input terminals, means including said first magnetic amplifier for allowing the passage of power pulses of said first series through said first magnetic amplifier following the appearance of a signal at the second input of said first magnetic amplifier, a second magnetic amplifier having a first input to receive said power pulses of said second series, said second magnetic amplifier having a second input, a coincidence gate connected between the first and second input terminals and the second input of said second magnetic amplifier, means including said second magnetic amplifier for allowing the passage of power pulses of said second series through said second magnetic amplifier following the appearance of a signal at the second input of the said second magnetic amplifier; and means including an inhibitory gate for preventing the passage of the power pulse from the first magnetic amplifier in response to an output from the second magnetic amplifier.

5. The computing circuit defined in claim 4 further comprising, a first load means connected to the output of said inhibitory gate and a second load means connected to the output of the second magnetic amplifier wherein power pulses developed across the first and second load means indicate the previous state of signals on the plurality of input lines.

6. A computing circuit comprising, a plurality of input lines and a circuit output line, a first magnetic amplifier having a signal input winding, an output winding, and a first load circuit in series with said output winding, said first magnetic amplifier producing a delayed output signal across said first load circuit in response to an input signal thereto, a first switching means connected between said plurality of input lines and the input winding of said first magnetic amplifier whereby signals on any one of said input lines are switched to the input winding of said first magnetic amplifier, a second magnetic amplifier having a signal input winding, an output winding and a second load circuit in series with said output winding, said second magnetic amplifier producing a delayed output signal across said second load circuit in response to an input signal thereto, a second switching means connected between said plurality of input lines and the input winding of said second magnetic amplifier whereby a signal is switched to the input winding of said second magnetic amplifier when signals occur on said plurality of input lines simultaneously, and a third switching means connected between the load circuits of said first and second magnetic amplifiers and said circuit output line comprising an inhibitory gate effective to switch a signal to said circuit output line when an output signal occurs from said first magnetic amplifier in the absence of an output signal from said second magnetic amplifier.

7. The computing circuit defined in claim 6 further comprising, a third load circuit connected to said circuit output line wherein signals developed across the second and third load circuits indicate the previous state of signals on the plurality of input lines.

References Cited in the file of this patent

UNITED STATES PATENTS

| | | |
|---|---|---|
| 2,670,445 | Felker | Feb. 23, 1954 |
| 2,712,065 | Elbourn et al. | June 28, 1955 |
| 2,806,648 | Rutledge | Sept. 17, 1957 |

OTHER REFERENCES

M. K. Haynes: "Magnetic Cores as Elements of Digital Computing Systems," thesis published by Illinois University (Urbana, Ill.) 1950. (Page 39, Fig. 28 relied on.)

Engineering Research Associates, "High-Speed Computing Devices," McGraw-Hill (New York), 1950. (Page 271, Fig. 13–3 relied on.)

Berkeley and Jensen: "How an Electronic Brain Works," published in Radio-Electronics, June 1951, page 39, Figs. 6 and 7 relied on.

Auerbach et al.: "The Binac," Proc. IRE, June 1952, page 20 relied on.